United States Patent [19]

Brecy et al.

[11] Patent Number: 4,996,538

[45] Date of Patent: Feb. 26, 1991

[54] APPARATUS FOR SEPARATING AND RECOVERING SOLID DEVELOPER PARTICLES TRANSPORTED BY A GASEOUS FLOW

[75] Inventors: André Brecy, Hericourt; Philippe Poinsot, Belfort, both of France

[73] Assignee: Bull S.A., Paris, France

[21] Appl. No.: 442,201

[22] Filed: Nov. 28, 1989

[30] Foreign Application Priority Data

Nov. 29, 1988 [FR] France ................................ 88 15595

[51] Int. Cl.[5] ................................................ G11B 9/00

[52] U.S. Cl. .................................... 346/74.3; 118/654; 118/657; 406/173

[58] Field of Search ............................. 346/74.2, 74.3; 118/654, 657; 406/173

[56] References Cited

U.S. PATENT DOCUMENTS

| | | | |
|---|---|---|---|
| 3,716,137 | 2/1973 | Frykhult . | |
| 4,233,382 | 11/1980 | Edwards et al. . | |
| 4,797,038 | 1/1989 | Correard | 406/173 |
| 4,834,586 | 5/1989 | Depew | 406/173 |

FOREIGN PATENT DOCUMENTS

| | | |
|---|---|---|
| 849950 | 9/1952 | Fed. Rep. of Germany . |
| 0686966 | 2/1953 | United Kingdom . |
| 1391835 | 4/1975 | United Kingdom . |

*Primary Examiner*—Bruce A. Reynolds
*Assistant Examiner*—Alrick Bobb
*Attorney, Agent, or Firm*—Kerkam, Stowell, Kondracki & Clarke

[57] ABSTRACT

The invention relates to an apparatus for separating and recovering solid particles transported by a gaseous flow. The apparatus includes a separation chamber (40), an admission conduit (43) by which the gaseous flow laden with particles arrives, an escape conduit (44) by which the flow leaves after having been relieved of its particles, a discharge conduit (47) toward which the particles separated from the gaseous flow are urged, a movable flap (49) making it possible with the discharge conduit to comprise a particle recovery box, and a helical device (52) placed in the discharge conduit to prevent the particles thus recovered from being re-aspirated by the rising flow that escapes via the escape conduit (44). The invention is applicable to magnetographic printing machines.

19 Claims, 2 Drawing Sheets

APPARATUS FOR SEPARATING AND RECOVERING SOLID DEVELOPER PARTICLES TRANSPORTED BY A GASEOUS FLOW

CROSS REFERENCE TO RELATED APPLICATION

This application is related to U.S. application Ser. No. 442,202, filed Nov. 28, 1989, and assigned to the same assignee as the present invention.

FIELD OF THE INVENTION

The present invention relates to an apparatus for separating and recovering solid developer particles transported by a gaseous flow. More particularly, but not exclusively, such apparatus is used in non-impact printing machines, in which developer particles, after having been deposited to excess on the recording carrier with which these machines are equipped, are removed from the carrier surface with a suction device and are collected in a recovery box for recycling.

BACKGROUND OF THE INVENTION

Non-impact printers used in information processing equipment are well known at present. These machines include a recording carrier, most often comprising a rotary drum or an endless belt, on the surface of which sensitized zones, also known as latent images, can be formed electrostatically or magnetically, corresponding to the characters or images to be printed. These latent images are then developed, or in other words made visible, with the aid of a powdered developer, which when deposited on the recording carrier is attracted only by the sensitized zones on it, thus forming an image in powder on the surface of the carrier. After that, the recording carrier is put in contact with a sheet of paper to enable the developer particles comprising the powdered image to be transferred to the sheets and definitively fixed there.

The application of developer particles to the recording carrier in printing machines of this type is accomplished by applicator devices of a known type, such as that described in U.S. Pat. No. 4,246,588 (corresponding to French Pat. No. 2.408.462). With these applicator devices, however, despite all the care taken in their construction, it is difficult to prevent the developer particles from being deposited not only to excess over the sensitized zones of the recording carrier but also, although in very small amounts, outside these zones. For this reason the printers are also provided with a retouching device, which is disposed between the particle applicator device and the station where the particles are transferred to a sheet of paper and makes it possible to remove the excess developer particles located on the surface of the recording carrier. Although retouching devices capable of performing the retouching by magnetic attraction or by blowing air have been made, the preference at present is for retouching devices that function by air suction and have the advantage of being non-polluting and of enabling removal of the excess particles on the recording carrier surface, without requiring that the particles have magnetic properties in order to accomplish this. Hence a retouching device has been embodied as described in U.S. Pat. 3,680,528, which includes both a suction conduit provided with a slit or nozzle, extending in proximity with the surface of the recording carrier, and an opening connected via a duct to a suction turbine. In this device, the air aspirated via the slit in the suction conduit entrains the excess particles located on the portions of the recording carrier located vertically of that slit. The air thus laden with particles circulates in the duct, and then having passed through the turbine is turned back toward an outlet conduit to the end of which a recovery bag, made of some material permeable to air, has been affixed. The air that is returned via the turbine can thus pass through the bag and be returned to the atmosphere, while the developer particles that were transported by this flow of air are stopped by the mesh of the bag and can then be recovered and later replaced in the applicator device. In this retouching device, however, because the air that passes through the suction turbine is necessarily laden with developer particles, over the long term the turbine is fouled, which makes this retouching device particularly tedious to maintain.

To overcome this disadvantage, a retouching device as described in U.S. Pat. No. 4,046,682 has been proposed, in which an endless belt of a material permeable to air and thus acting as a filter, passes in the course of its path through the duct connecting the suction conduit to the suction turbine. Under these conditions, the developer particles that are transported by the air aspirated by the turbine are stopped in their passage by the endless belt and hence cannot pass through the turbine. Nevertheless, this is not entirely satisfactory, because not only is the recovery of the particles captured by the belt relatively impractical and never complete, but also the portion of the duct that is located between the belt and the suction nozzle finally becomes more or less obstructed, markedly diminishing the output of the suction turbine.

OBJECT AND SUMMARY OF THE INVENTION

The present invention overcomes the disadvantages of the prior art and proposes an apparatus which, when it is mounted in a pneumatic circuit in which a gaseous flow transporting solid particles circulates, where the gaseous flow is for example a circuit including a retouching device used in a non-impact printing machine, makes it possible to separate and recover practically all the particles in this gaseous flow. The apparatus of the present invention includes a device similar to the devices known as cyclones that are typically used to perform purification of a flow of air laden with solid particles, before returning the air to the atmosphere. Each of these cyclones various embodiments of which have been described in U.S. Pat. Nos. 3,716,137 and 3,893,914 and in Soviet Pat. Nos. 1.096.002 and 1.130.411, generally has a separation chamber provided in its upper portion with an admission conduit, via which the air laden with particles arrives in the chamber, and an escape conduit, via which the air that has been relieved of its particles leaves this chamber. The chamber is also provided in its lower portion with an outlet opening that communicates with a discharge conduit of slight length that opens into the open air, which makes it possible for the particles separated from the air flow in the chamber and drawn by gravity toward the discharge conduit to leave the chamber by that conduit and drop into a non-sealed container disposed below it. When there is a flow of air containing powdered substances, such as sawdust, through them, the cyclones do make it possible to eliminate the very great majority of these substances before the air flow is returned to the atmosphere. However, using them in a non-impact printing machine to separate and recover virtually all the particles of developer transported by an air flow originating in a suction retouching device has never been imagined until now, because the particles are very fine and have a tendency to disperse when they drop, forming a fog of particles that is difficult to recover. Under these conditions, it would be practically impossible with the cyclones to recover nearly all the developer particles transported by the air flow; this is even more disadvantageous since the particles have undergone virtually no modification and could readily be recycled, or in other words reintroduced into the reservoir of the applicator device for re-use.

In view of the poor performance of these last devices in performing recovery of the developer particles, the invention relates, more precisely, to an apparatus for separating and recovering solid developer particles transported by a gaseous flow characterized in that it includes:

a separation chamber having a practically vertically disposed axis of revolution, and being provided in its upper portion with both an admission conduit, arranged so as to create a turbulent flow for a gaseous flow laden with solid developer particles that arrives in this chamber via this admission conduit, and an axially disposed escape conduit extending to the interior of the chamber to enable the evacuation of the gaseous flow relieved of its particles, the chamber being further provided, in its lower portion, with an outlet opening communicating with a discharge conduit closed at its lower end by a movable shutter to make a box for recovery of particles, with the developer particles, after being separated from the gaseous flow in the chamber, being urged by gravity toward the discharge conduit, so that they finally drop into the box;

and a helical device disposed in the discharge conduit and in proximity with the outlet opening, the helical device having a surface the helical edge of which is in contact with the internal wall of the discharge conduit, and the inclination of which is oriented in the same direction as that of the helical path of the solid particles, to prevent the particles arriving in the recovery box from being re-aspirated by the rising gaseous flow escaping via the escape conduit.

The invention will be better understood and further objects and advantages thereof will become more apparent from the ensuing description given as a non-limiting example, taken in conjunction with the accompanying drawings.

DESCRIPTION OF THE PREFERRED EMBODIMENTS

Figure 1:
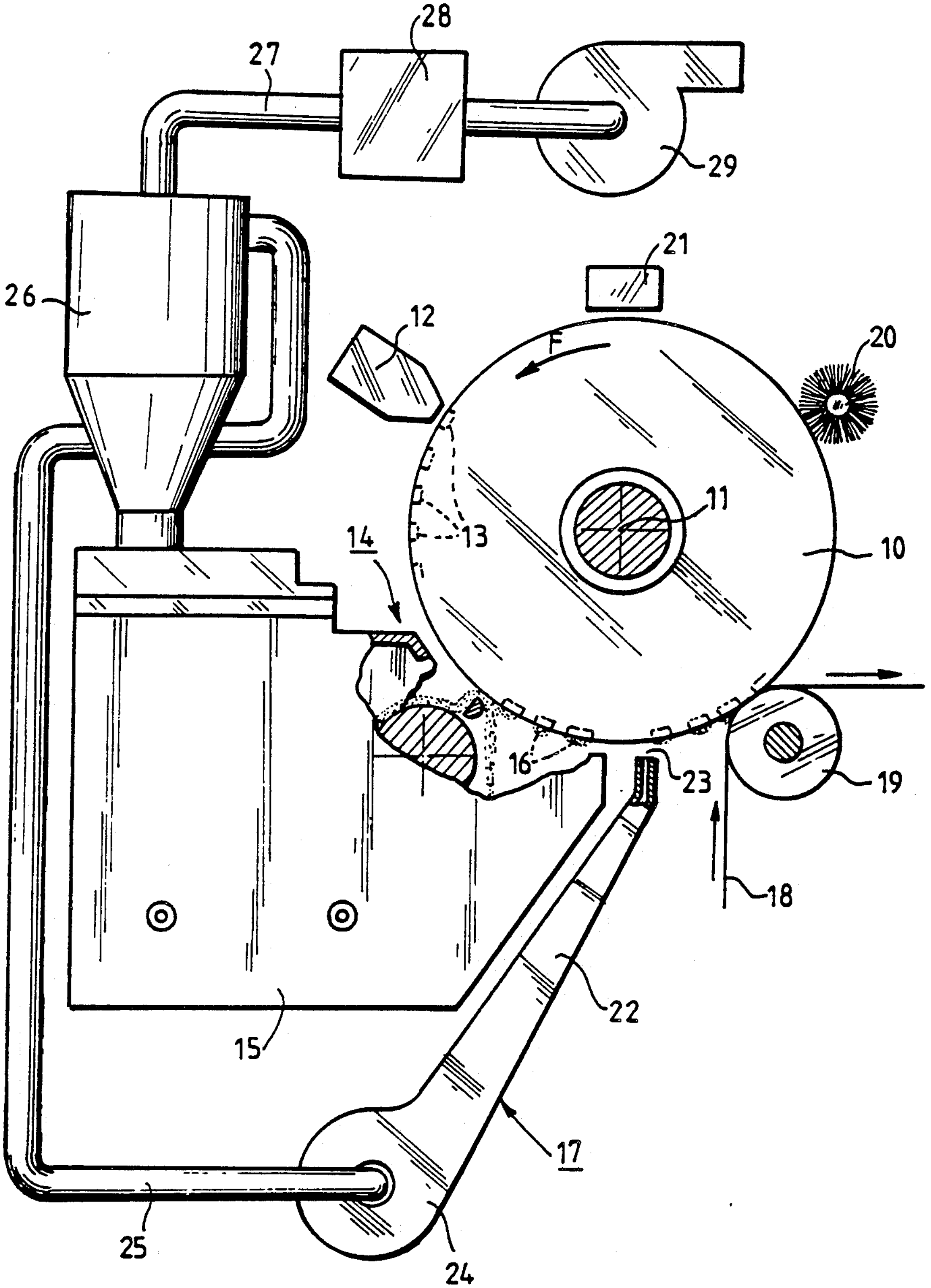
FIG. 1 is a fragmentary schematic view of a magnetographic printing machine provided with a pneumatic circuit including a retouching device and an apparatus for separation and recovery of particles arranged according to the invention.

The printing machine schematically shown in FIG. 1 includes a recording carrier, which in the example described comprises a magnetic drum 10. The drum is mounted so that it can rotate about a horizontal shaft 11. An electric motor (not shown) assures the rotation of the drum in the direction indicated by the arrow F. Information is recorded on the drum by a magnetic recording device 12 including plurality of heads disposed side by side and aligned parallel to the axis of rotation 11 of the drum. Each of the heads, each time it is excited for a brief instant by an electric current, generates a variable magnetic field, the effect of which is to create practically point-shaped magnetized zones 13 on the surface of the drum that moves past the recording device 12; the set of these zones comprises a latent magnetic image corresponding to an image to be printed. The magnetized zones 13 then travel past an applicator device 14 which is disposed practically under the drum 10 and makes it possible to apply particles of a powdered developer contained in a reservoir 15 to the surface of the drum. The developer particles thus applied to the drum 10 adhere in principle only to the magnetized zones on it, such that the magnetized zones that have traveled past the applicator device 14 are coated with a layer of developer, and this layer forms the image on the drum 10 of the characters that are to be printed. In the example described, the developer comprises particles of resin containing magnetic particles; the resin particles have a size on the order of one-twentieth of a micron and the resin is capable of melting when subject to thermal radiation and thus being affixed to paper onto which it has been deposited. Nevertheless, it should be noted that the nature of this developer is not specific to the invention, and that in the case of an electrostatic printer, to which the invention is understood to apply as well, the developer may certainly comprise a powder not including any magnetic particles. Similarly, any standard applicator device may be used to apply developer to the drum 10. In a highly advantageous embodiment, however, the applicator device 14 shown in FIG. 1 is of the type described and shown in the aforementioned U.S. Pat. No. 4,246,588.

The developer, which adheres principally to the magnetized zones 13, then forms deposits 16 of particles on the surface of the drum 10. These deposits 16 then pass before a retouching device 17, the role of which is to eliminate the particles that have adhered anywhere but on the magnetized zones 13, as well as particles located in excess on the zones. The developer particles that remain on the drum 10 afterward are transferred virtually totally to a sheet of paper 18 which is pressed against the drum 10 by a pressure roller 19. The residual particles of developer are still located on the drum 10 once this transfer has been made are then lifted by means of a cleaning device 20 of a known type, such as a brush. After that, the magnetized zones that have traveled past the cleaning device 20 travel past an erasing device 21, where they are then erased, which enables the portions of the drum 10 that have thus been demagnetized to be capable of being remagnetized when they again move past the recording device 12. The retouching device 17 shown in FIG. 1 is the type additionally described in U.S. Pat. No. 4,233,382. Without entering into all the details of the structure of this device, it can be noted that the retouching device shown in FIG. 1 includes a suction nozzle or conduit 22 practically in the form of a right prism and having an air admission slit 23 at one of its ends that extends in proximity with the surface of the drum 10 along a direction parallel to the axis of rotation 11 of the drum. At its other end the suction conduit 22 communicates with a cylindrical chamber 24 disposed such that the generatrices of the chamber extend parallel to the direction of elongation of the air admission slit 23. One of two circular walls of this chamber is provided with a suction opening having a duct 25, which enables the chamber 24 to be connected to an apparatus 26 for separation and recovery of particles to be described hereinafter. Via another duct 27 provided with a filtering element 28, this apparatus 26 is in turn connected to a suction turbine 29. It will now be understood that when the turbine 29 is started up, a partial vacuum is created inside the pneumatic device comprising the retouching device 17, the duct 25, the separation and recovery apparatus 26, the duct 27, the filter element 28 and the turbine 29. Consequently the developer particles that have been deposited to excess on the surface of the drum 10 are entrained, when they travel past the slits 23 of the suction conduit 22, by the air that has aspirated through this slit. This air, thus laden with developer particles, then form a flow of air that circulates in succession in the suction conduit 22 the chamber 24 and the duct 25. This air is relieved of its particles when it passes through the apparatus 26, and then, having practically been purified when it leaves this apparatus, circulates in the duct 27 before passing through the filter element 28 and finally being returned to the atmosphere via the turbine 29. Since the apparatus 26 stops practically all the particles that have been transported by this air flow, as will be described below, the air that passes through the turbine is unlikely to foul it.

Figure 2:
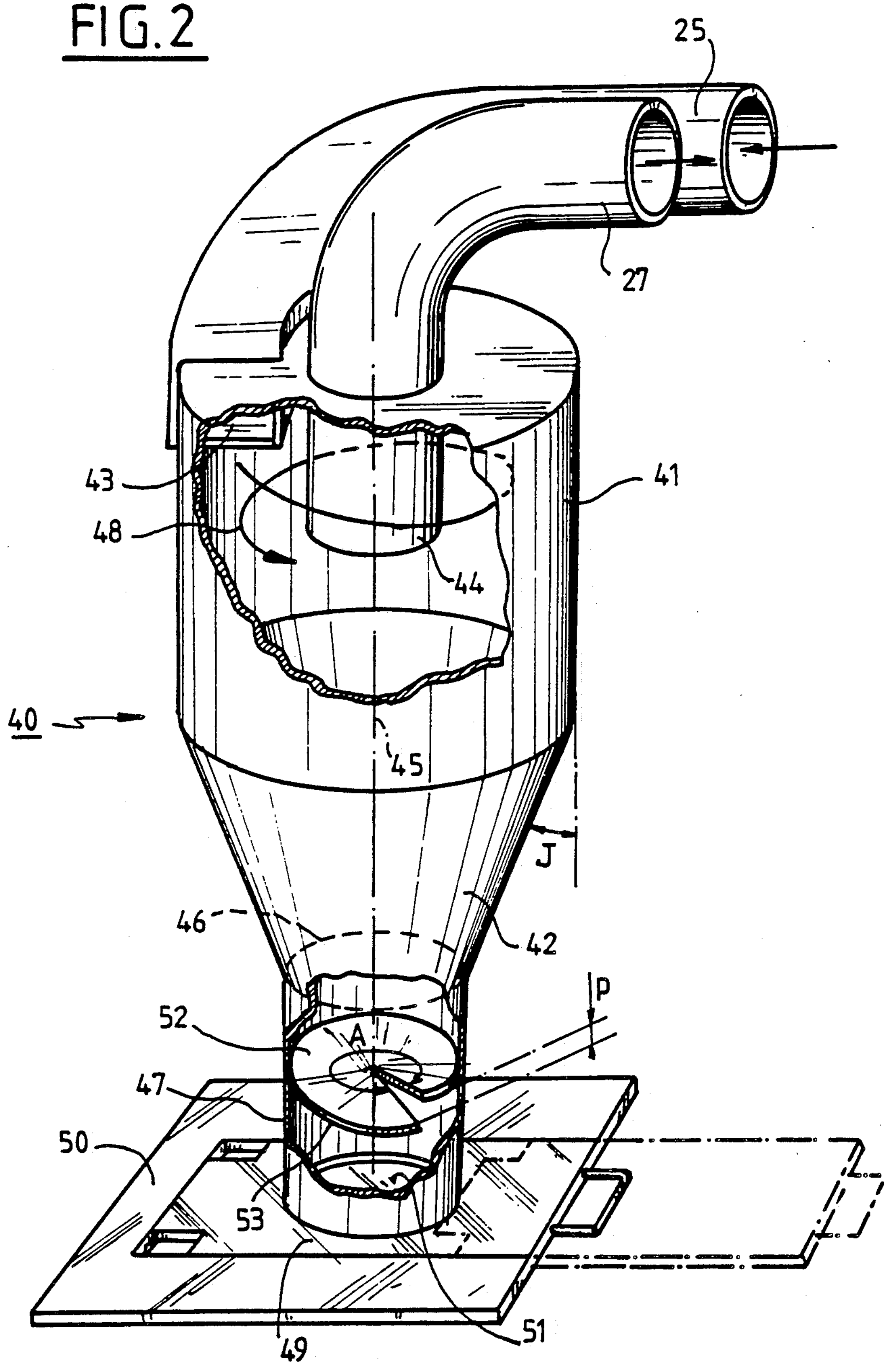
FIG. 2 is a perspective view, with cut-away portions, showing certain details of embodiment of the apparatus for separation and recovery of particles with which the machine shown in FIG. 1 is equipped.

Turning now to FIG. 2, the structure of the apparatus 26 will now be described. This apparatus makes it possible not only to separate the developer particles that have been transported by the air flow circulating in the pneumatic device but also to recover practically all the particles, without a possibility of re-aspiration of the particles by this air flow. The apparatus 26 shown in FIG. 2 includes a separation chamber 40, comprising an upper portion 41 of cylindrical shape and a lower portion 42 of conical shape. The chamber 40 is provided in its upper portion with an admission conduit 43, on the one hand, connected to the duct 25 via which the air laden with developer particles arrives; the admission conduit is disposed at a tangent to the cylindrical wall of the portion 41 in such a manner as to create a turbulent flow on the interior of the chamber for the air that arrives in this chamber via this conduit. On the other hand, the chamber 40 is provided with an escape conduit 44 of cylindrical shape, which is disposed along the vertical axis 45 of the chamber 40 and extends to the interior of the cylindrical portion 41 of this chamber, to permit the evacuation of the air which has been relieved of its particles in this chamber. The escape conduit 44 is connected to the duct 27 connecting the apparatus 26 to the suction turbine 29. In its lower portion, the separation chamber 40 is also provided with an outlet opening 46 that communicates with a discharge conduit 47 of cylindrical shape.

In a known manner, the turbulence created by the air flow arriving in the chamber 40 via the admission conduit 43 rotates rapidly in a direction indicated by the arrow 48 in FIG. 2. Centrifugal force causes the developer particles, the specific mass of which is higher than that of air, to separate from the air flow and form a turbulent layer that comes into contact with the cylindrical wall of the portion 41 of the chamber. However, these particles are also subject to the force of gravity, so that while continuing to rotate, they finally descend in the portion 42 of the chamber and engage the discharge conduit 47. To permit the recovery of these particles, the discharge conduit 47 is normally closed at its lower end by a movable flap 49, which as FIG. 2 shows is capable of sliding horizontally in the rails of a fixed plate 50 integrally joined to the frame of the machine. The flap 49, which is actuated in a known manner, for example manually, can assume two positions; first, a closing position illustrated in solid lines in FIG. 2, in which it completely closes the lower opening of the discharge conduit 47 and with the conduit forms a box 51 in which the particles that have been separated from the air flow accumulate, and second an open position, shown in dot-dash lines in FIG. 2, in which it enables the particles thus accumulated to leave the discharge conduit 47 so as to be replaced in the reservoir 15 of the applicator device 14 shown in FIG. 1. This reintroduction of the particles can be effected once the particles have been transported, either manually or with the aid of a transport device, from the box 51 to the reservoir 15. However, in a particularly advantageous embodiment which is shown in FIG. 1, the separation and recovery apparatus 26 is disposed just above the reservoir 15, so that the return of the particles recovered in the box 51 into the reservoir 51 is accomplished simply by moving the flap 49 to the open position when the box is full, which allows the particles to drop into the reservoir. In a variant embodiment, the flap 49 may also advantageously be replaced with a device for the reintroduction of particles as described in a patent application filed on this same date by the present applicant.

As can be seen in FIG. 2, the separation and recovery apparatus 26 also includes a helical device 52 that is disposed in the discharge conduit 47, in proximity with the outlet opening 46. This device 52, which is shaped from the very thin plate, has a surface defined by a helical edge 53, and it is dimensioned such that its helical edge 53 is in contact with the internal wall of the discharge conduit 47. The device 52 is centered along the vertical axis 45 of the chamber 40 and the conduit 47, and it extends all the way around this axis 45, over a sector the angle A of which is substantially equal to 360°. Under these conditions, the two ends of the helical edge 53 of this device are located practically one under the other and are spaced apart by a distance P equal to the pitch of the helix. FIG. shows that the direction of the helix of the device 52 is the same as that of the helical path taken by the particles inside the separation chamber 40. In other words, the plate comprising this device has an inclination that is oriented in the same direction as that of the helical arrow 48. Under these conditions, there is no risk that the helical device 52 will be a obstacle to the developer particles, which after having been separated from the air flow in the separation chamber 40 enter the opening that remains between the two radial edges of the device and accumulate in the recovery box 51. To facilitate the passage of the particles through this opening and to prevent the particles accumulated in the box from being subjected to the action of the rising air current that is exerted in the axial portion of the chamber, it is preferable for the pitch P of the helix of the device 52 to be between 5 mm and 12 mm.

It has moreover been observed that the best results are obtained by making the helical device 52 in such a way that its helical edge 53 has an inclination with respect to the horizontal of a value i between 3° and 10°. Under these conditions, the suitable limit values to be assigned to the internal radius R of the discharge conduit 47 in order to obtain the best results can be determined, and in fact these limit values are obtained by the following equations:

$$R_m = P/2\pi tg10° \text{ and } P/2\pi tg3°$$

that is, $$R_m \approx P/1.108 \text{ and}$$

$$R_M \approx P/0.33.$$

Thus in the case where the pitch P of the helix is for instance equal to 5 mm, the discharge conduit 47 may have an internal radius included between the following two values:

$$R_m \approx 5/1.108 \text{ and}$$

$$R_M \approx 5/0.33;$$

hence:

$$R_m \approx 4.5 \text{ mm and } R_M \approx 15 \text{ mm}$$

In this case, a discharge conduit the internal diameter of which equal 2.0 cm for example, is perfectly suitable as a preferred diameter for the discharge conduit.

Similarly, in the case where the pitch P of the helix equals 1 cm, the discharge conduit may have an internal radius included between the following values:

$$R_m \approx 10/1.108 \text{ and}$$

$$R_M \approx 10/0.33;$$

hence:

$$R_m \approx 9 \text{ mm and } R_M \approx 30 \text{ mm.}$$

In that case, a discharge conduit having an internal diameter equal to 4 cm, for example, will be perfectly suitable.

It should again be noted that to permit the separation and recovery apparatus to function correctly, the escape conduit 44 has an internal diameter the value of which is on the same order of magnitude as that of the internal diameter of the discharge conduit 47.

Thus for example in the case where the discharge conduit 47 has an internal diameter of 4 cm, the escape conduit 44 may have an internal diameter of 35 mm. Preferably, the internal diameter of the escape conduit is smaller than that of the discharge conduit, and differs by no more than 15% from that of the internal diameter of the latter conduit.

In addition, the conical portion 42 of the separation chamber 40 is made in such a manner that its lateral wall forms an angle J equal to no more than 15° with the axis of revolution 45 of the chamber, or in other words with the vertical. Because of this arrangement, practically all the developer particles entering the chamber via the admission conduit 43 are separated from the air flow that entrains them until then.

It should again be noted that the output of air of the suction turbine 29 is adjusted by known means (not shown) such that the air pressure in the interior of the separation chamber 40 is kept at a fixed value $p_1$, which is naturally lower than the value $p_0$ of atmospheric pressure and which is between 760 and 900 hectopascals. In other words, the partial vacuum $\Delta p = p_0 - p_1$ on the interior of this chamber is kept at a fixed value substantially between 255 and 115 hectopascals.

Operating under the best conditions as indicated above, practically 99% of the developer particles that were transported by the air flow originating in the retouching device have been recovered.

It is understood that the invention is in no way limited to the embodiments described and illustrated, which are given solely by way of example. On the contrary, the invention includes any means comprising technical equivalents of those described and shown, taken in isolation or in combination and embodied within the scope defined by the following claims.

What is claimed is:

1. An apparatus for separating and recovering solid developer particles transported by a gaseous flow comprising:

a separation chamber (40) having an axis of revolution (45) disposed substantially vertically, the chamber having in its upper portion an admission conduit (43) for admitting gas into the chamber (40) and arranged so as to create a turbulent flow for a gaseous flow, laden with solid developer particles, and an escape conduit (44) disposed axially of the chamber to enable the evacuation of the gaseous flow, from which the particles have been removed, the chamber further including, in its lower portion, an outlet opening (46) communicating with a discharge conduit (47) having a section smaller than that of the separation chamber, said conduit being closed at its lower end by a movable shutter (49) to provide a box for recovery of particles, the chamber being arranged such that the developer particles, after being separated from the gaseous flow int he chamber, are urged by gravity toward the discharge conduit and into the box;

and a helical device (52) disposed in the discharge conduit (47) and in proximity with the outlet opening (46), the helical device having a surface the helical edge (53) of which is in contact with the internal wall of the discharge conduit, and the inclination of which with respect tot he horizontal has a value between 3° and 10° and is oriented in the same direction as that of the helical path of the solid particles to be transported by the gaseous flow, to prevent particles arriving in the recovery box from being re-aspirated by the rising gaseous flow which circulates above said helical device and finally escapes via the escape conduit.

2. The apparatus as defined by claim 1, characterized in that the helical device (52) extends over a sector the angle (A) of which is substantially equal to 360°.

3. The apparatus as defined by claim 1, characterized in that the discharge conduit (47) has an int radius the value (R) of which is between two limit values $R_m$ and RM defined by the following:

Rm = P/1.108 and

RM = P/0.33, where P represents the value of the pitch of the helix of the helical device (52).

4. The apparatus as defined by claim 2, characterized in that the discharge conduit (47) has an internal radius the value (R) of which is between two limit values $R_m$ and RM defined by the following:

Rm = P/1.108 and

RM = P/0.33, where P represents the value of the pitch of the helix of the helical device (52).

5. The apparatus as defined by claim 1, characterized in that the pitch (P) of the helix of the helical device (52) is greater than 5 mm.

6. The apparatus as defined by claim 2, characterized in that the pitch (P) of the helix of the helical device (52) is greater than 5 mm.

7. The apparatus as defined by claim 3, characterized in that the pitch (P) of the helix of the helical device (52) is greater than 5 mm.

8. The apparatus as defined by claim 4, characterized in that the pitch (P) of the helix of the helical device (52) is greater than 5 mm.

9. The apparatus as defined by claim 5, characterized in that the pitch (P) of the helix of the helical device (52) is less than 12 mm.

10. The apparatus as defined by claim 6, characterized in that the pitch (P) of the helix of the helical device (52) is less than 12 mm.

11. The apparatus as defined by claim 7, characterized in that the pitch (P) of the helix of the helical device (52), is less than 12 mm.

12. The apparatus as defined by claim 8, characterized in that the pitch (P) of the helix of the helical device (52) is less than 12 mm.

13. The apparatus as defined by claim 1, characterized in that the escape conduit (44) has an internal diameter on the same order of magnitude as the internal diameter of the discharge conduit (47).

14. The apparatus as defined by claim 13, characterized in that the internal diameter of the escape conduit (44) is less than the internal diameter of the discharge conduit (47), and its value differs by no more than 15% from the value of the internal diameter of the latter conduit (47).

15. The apparatus as defined by claim 1, characterized in that the separation chamber (40) comprises an upper cylindrical portion (41) joined to a lower conical portion (42), the lateral wall of the conical portion forming an angle (J) with the axis of revolution (45) of the chamber equal to at most 15°.

16. The apparatus as defined by claim 1, characterized in that in the interior of the separation chamber (40), the pressure - which is less than atmospheric pressure—is at a fixed value between 760 and 900 hectopascals.

17. A non-impact printing machine having an apparatus for separating and recovering solid developer particles transported by a gaseous flow, said separating and recovering apparatus further comprising:

a separation chamber (40) having an axis of revolution (45) disposed substantially vertically, the chamber having in its upper portion an admission conduit (43) for admitting gas into the chamber (40) and arranged so as to create a turbulent flow for a gaseous flow, laden with solid developer particles, and an escape conduit (44) disposed axially of the chamber and extending to the interior of the chamber to enable the evacuation of the gaseous flow, from which the particles have been removed, the chamber further including, in its lower portion, an outlet opening (46) communicating with a discharge conduit (47) having a section smaller than that of the separation chamber, said conduit being closer at its lower end by a movable şhutter (49) to provide a box for recovery of particles, the chamber being arranged such that the developer particles, after being separated form the gaseous flow in the chamber, are urged by gravity toward the discharge conduit and into the box;

and a helical device (52) disposed in the discharge conduit (47) and in proximity with the outlet opening (46), the helical device having a surface the helical edge (53) of which is in contact with the internal wall of the discharge conduit, and the inclination of which with respect to the horizontal has a value between 3° and 10° and is oriented int he same direction as that of the helical path of the solid particles to be transported by the gaseous flow, to prevent particles arriving in the recovery box from being re-aspirated by the rising gaseous flow which circulates above said helical device and finally escapes via the escape conduit.

18. An apparatus for separating and recovering solid developer particles transported by a gaseous flow, comprising:

a separation chamber (40) having an axis of revolution (45) disposed substantially vertically, the chamber having in its upper portion an admission conduit (43) for admitting gas into the chamber (40) and arranged so as to create a turbulent flow for a gaseous flow, laden with solid developer particles, and an escape conduit (44) disposed axially of the chamber and extending to the interior of the chamber to enable the evacuation of the gaseous flow, from which the particles have been removed, the chamber further including, in its lower portion, an outlet opening (46) communicating with a discharge conduit (47), said conduit being closed at its lower end by a movable shutter (49) to provide a box for recovery of particles, the chamber being arranged such that the developer particles, after being separated from the gaseous flow int he chamber, are urged by gravity toward the discharge conduit and into the box:

and a helical device (52) disposed in the discharge conduit (47) and in proximity with the outlet opening (46), the helical device having a surface the helical edge (53) of which is in contact with the internal wall of the discharge conduit, and the inclination of which is oriented in the same direction as that of the helical path of the solid particles to be transported by the gaseous flow, to prevent particles arriving in the recovery box from being re-aspirated by the rising gaseous flow which circulates above said helical device and finally escapes via the escape conduit, and wherein a pitch (P) of the helix of the helical device (52) is greater than 5 mm.

19. An apparatus for separating and recovering solid developer particles transported by a gaseous flow, comprising:

a separation chamber (40) having an axis of revolution (45) disposed substantially vertically, the chamber having in its upper portion an admission conduit (43) for admitting gas into the chamber (40) and arranged so as to create a turbulent flow for a gaseous flow, laden with solid developer particles, and an escape conduit (44) disposed axially of the chamber and extending to the interior of the chamber to enable the evacuation of the gaseous flow, from which the particles have been removed, the chamber further including, in its lower portion, an outlet opening (46) communicating with a discharge conduit (47), said conduit being closed at its lower end by a movable shutter (49) to provide a box for recovery of particles, the chamber being arranged such that the developer particles, after being separated from the gaseous flow in the chamber, are urged by gravity toward the discharge conduit and into the box;

and a helical device (52) disposed int he discharge conduit (47) and in proximity with the outlet opening (46), the helical device having a surface the helical edge (53) of which is in contact with the internal wall of the discharge conduit, and the inclination of which is oriented in the same direction as that of the helical path of the solid particles to be transported by the gaseous flow, to prevent particles arriving in the recovery box from being re-aspirated by the rising gaseous flow which circulates above said helical device and finally escapes via the escape conduit, and wherein the separation chamber (40) comprises an upper cylindrical portion (41) joined to a lower conical portion (42), the lateral wall of the conical portion forming an angle (J) with the axis of revolution (45) of the chamber equal to at most 15°.

* * * * *

UNITED STATES PATENT AND TRADEMARK OFFICE
CERTIFICATE OF CORRECTION

PATENT NO. : 4,996,538

DATED : February 26, 1991

INVENTOR(S) : Andre Brecy et al

It is certified that error appears in the above-identified patent and that said Letters Patent is hereby corrected as shown below:

Column 8,

Claim 1, line 10, after "chamber" insert --and extending to the interior of the chamber--.

Claim 1, line 20, delete "int he" and substitute -- in the --.

Claim 1, line 27, delete "tot he" and substitute -- to the --.

Claim 3, line 2, delete "int" and substitute -- internal--.

Claim 3, line 4, delete "RM" and substitute -- $R_M$--.

Claim 3, line 5, delete "Rm" and substitute -- $R_m$ --.

Claim 3, line 6, delete "RM" and substitute -- $R_M$ --.

Claim 4, line 4, delete "RM" and substitute -- $R_M$ --.

UNITED STATES PATENT AND TRADEMARK OFFICE

CERTIFICATE OF CORRECTION

PATENT NO. : 4,996,538

DATED : February 26, 1991

INVENTOR(S) : Andre BRECY, et al

It is certified that error appears in the above-indentified patent and that said Letters Patent is hereby corrected as shown below:

Column 8, line 5, claim 4, delete "Rm" and substitute -- $R_M$ --.
line 6, claim 4, delete "Rm" and substitute -- $R_M$ --.

Column 10, line 31, Claim 17, delete "int he" and substitute -- in the --.

Column 10, line 19, Claim 18, delete "int he" and substitute -- in the --.

Column 11, line 21, Claim 19, delete "int he" and substitute -- in the --.

Signed and Sealed this

Thirteenth Day of July, 1993

Attest:

MICHAEL K. KIRK

*Attesting Officer*

*Acting Commissioner of Patents and Trademarks*